(12) United States Patent
Morovic et al.

(10) Patent No.: US 10,728,423 B2
(45) Date of Patent: Jul. 28, 2020

(54) COLORANT VECTOR CALIBRATION

(71) Applicant: HEWLETT-PACKARD DEVELOPMENT COMPANY, L.P., Spring, TX (US)

(72) Inventors: Peter Morovic, Sant Cugat del Valles (ES); Jan Morovic, Colchester (GB); Jordi Arnabat Benedicto, Sant Cugat del Valles (ES); Javier Maestro Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/616,461

(22) PCT Filed: Jul. 24, 2017

(86) PCT No.: PCT/US2017/043471
§ 371 (c)(1),
(2) Date: Nov. 23, 2019

(87) PCT Pub. No.: WO2019/022699
PCT Pub. Date: Jan. 31, 2019

(65) Prior Publication Data
US 2020/0177768 A1    Jun. 4, 2020

(51) Int. Cl.
*H04N 1/60* (2006.01)
*G06T 1/20* (2006.01)
*H04N 1/00* (2006.01)

(52) U.S. Cl.
CPC ............... *H04N 1/603* (2013.01); *G06T 1/20* (2013.01); *H04N 1/00068* (2013.01); *H04N 1/00087* (2013.01)

(58) Field of Classification Search
None
See application file for complete search history.

(56) References Cited

U.S. PATENT DOCUMENTS

| 7,252,360 B2 | 8/2007 | Hersch et al. |
| 8,154,777 B2 | 4/2012 | Zhang et al. |
| (Continued) | | |

FOREIGN PATENT DOCUMENTS

WO    WO-2017184151 A1    10/2017

OTHER PUBLICATIONS

HPDC, "International Search Report & Written Opinion," dated Jan. 31, 2018, International App. No. PCT/US2017/043471, 6 p.
(Continued)

*Primary Examiner* — Anh-Vinh T Nguyen
(74) *Attorney, Agent, or Firm* — HP Inc. Patent Department

(57) ABSTRACT

Methods for printer color calibration are disclosed. A nominal Neugebauer Primary area coverage (NPac) vector from an NPac space is then determined from a color mapping, the nominal NPac vector corresponding to a given color value in a color space. One or more colorant calibration factors each associated with a color of colorant are received; the calibration factors representing operational characteristics of the printer. One or more optimization metrics for constraining desired properties of an objective calibrated NPac vector to be generated are also received. The calibrated NPac vector is generated based on the nominal NPac vector such that: the generated calibrated NPac vector is convex; and for each given color of colorant the usage of colorant associated with the generated calibrated NPac vector is equal to the product of usage of colorant associated with the nominal NPac vector; and the calibration factor for the given color of colorant.

15 Claims, 2 Drawing Sheets

(56) References Cited

U.S. PATENT DOCUMENTS

| | | | |
|---|---|---|---|
| 2004/0233463 A1 | 11/2004 | Hersch et al. | |
| 2007/0097461 A1 | 5/2007 | Ng et al. | |
| 2007/0263098 A1 | 11/2007 | Quan et al. | |
| 2009/0310154 A1* | 12/2009 | Morovic | H04N 1/54 358/1.9 |
| 2010/0214576 A1 | 8/2010 | Morovic et al. | |
| 2016/0080608 A1* | 3/2016 | Morovic | G06K 15/02 358/3.23 |
| 2016/0080612 A1* | 3/2016 | Martinez de Salinas Vazquez | G06K 15/1878 358/3.06 |
| 2016/0086059 A1* | 3/2016 | Morovic | B41J 2/2146 347/19 |
| 2016/0155032 A1 | 6/2016 | Morovic et al. | |
| 2017/0013174 A1* | 1/2017 | Morovic | H04N 1/6055 |
| 2018/0004468 A1* | 1/2018 | Morovic | G06F 3/121 |
| 2019/0037109 A1* | 1/2019 | Morovic | H04N 1/605 |
| 2019/0042165 A1* | 2/2019 | Morovic | H04N 1/52 |
| 2019/0089867 A1* | 3/2019 | Morovic | H04N 1/00023 |
| 2019/0149698 A1* | 5/2019 | Morovic | H04N 1/6033 358/1.9 |
| 2019/0279054 A1* | 9/2019 | Morovic | G06K 15/1878 |
| 2019/0281191 A1* | 9/2019 | Morovic | H04N 1/00 |
| 2019/0373138 A1* | 12/2019 | Gomez Minano | B41J 2/525 |
| 2020/0028992 A1* | 1/2020 | Morovic | H04N 1/405 |
| 2020/0036866 A1* | 1/2020 | Morovic | H04N 1/6008 |
| 2020/0045207 A1* | 2/2020 | Morovic | H04N 1/6033 |

OTHER PUBLICATIONS

Slavuj et al., "Estimating Neugebauer Primaries for Multi-channel Spectral Printing Modeling," Feb. 24, 2014, < http://proceedings.spiedigitallibrary.org/proceeding.aspx?articl.

\* cited by examiner

COLORANT VECTOR CALIBRATION

BACKGROUND

Digital images may be represented in different color spaces depending the output print target. A color space may comprise a certain number of primary colors which are used in conjunction with one another to produce further colors. For example, a digital image represented on a computer monitor, may be represented in a first color space, whereas when that digital image is printed, the printed digital image may use a second color space. To achieve this, color mapping may be used between the first color space and the second space.

There may be multiple combinations of primary colors which result in producing the desired target color.

BRIEF DESCRIPTION OF THE DRAWINGS

Various features of certain examples will be apparent from the detailed description which follows, taken in conjunction with the accompanying drawings, which together illustrate, by way of example, a number of features, and wherein.

DETAILED DESCRIPTION

Figure 1:
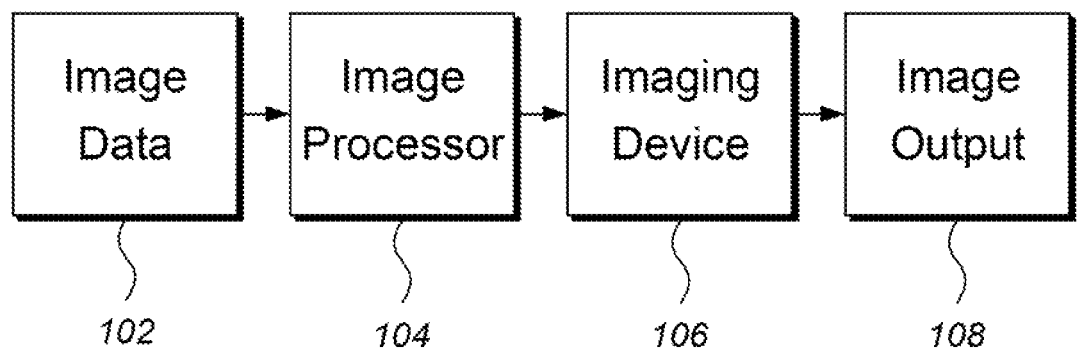
FIG. 1 is a schematic diagram of an image processing pipeline according to an example.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths. However, this is a high dimensionality representation and so a color model may be used to represent a color at a lower dimensionality. For example, certain color models make use of the fact that color may be seen as a subjective phenomenon rooted in the retinal and neural circuits of a human brain. In this case, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and BlacK (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 (L*, a*, b*—CIELAB) color space, wherein three variables represent lightness ('L') and opposing color dimensions ('a' and 'b'). Certain color models, such as RGB and CMYK may be said to be device-dependent, e.g. an output color with a common RGB or CMYK value may have a different perceived color when using different imaging systems.

When working with color spaces, the term "gamut" refers to a multidimensional volume in a color space that represents color values that may be output by the imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

As used herein, the term "color separation" refers to the output of a color mapping and halftoning process. In certain cases, a color separation may comprise multiple colorant components, e.g. one for each colorant in a printing system. The term "color separation" will be used herein to refer to the result of combining each of the multiple colorant components, rather than each of the colorant components themselves. Although certain printer examples have been described with reference to one or more colorant levels, it should be understood that any color mappings may be extended to other printing fluids such as glosses and/or varnishes that may be deposited in a printing system and that may alter a perceived output color.

FIG. 1 shows an example of an image processing pipeline. Certain examples described herein may be implemented within the context of this pipeline. In the example of FIG. 1, image data 102 is passed into an image processor 104. The image data 102 may comprise color data as represented in a first color space, such as pixel representations in an RGB color space. The image processor 104 maps the color data from the first color space to a second color space for use by an imaging device 106 to generate an image output 108. As discussed in more detail below, the second color space may comprise a Neugebauer Primary Area Coverage (NPac) color space. Color data in an NPac space may be used to implement one or more halftone portions in an image output 108. The imaging device may comprise one or more of a printer and a display. For example, the image processor may be arranged to output one or more of print control data that is communicated to a printer and image control data that is communicated to a display device. A printer may be arranged to generate a print output as instructed by the print control data. Likewise, a display device may be arranged to generate a display output as instructed by the image control data. The color representation used by any printer and any display device may be different. In one case, a print output may comprise an image formed from colored inks deposited on a substrate. The substrate may be paper, fabric, plastic or any other suitable print medium. Similarly, a display output may comprise an image formed from a plurality of Light Emitting Diodes or Liquid Crystal Display elements. In certain cases one of a printer and a display device may be used. The image processor may be separate from, or combined with, the imaging device.

As described above, certain examples herein are arranged to output color data in a Neugebauer Primary Area Coverage (NPac) space. An NPac space provides a large number of metamers that facilitate the generation of a combined color separation, e.g. provide a large number of output color values that map to a common input color value in one or more of XYZ, Lab and RGB color spaces.

An NPac vector represents a distribution of one or more Neugebauer Primaries (NPs) over a unit area. For example, in a binary (bi-level) printer, an NP is one of $2^k$ combinations of k inks within the printing system. For example, if a printer uses CMY inks and two printing levels there can be eight NPs, these NPs relate to the following: C, M, Y, C+M, C+Y, M+Y, C+M+Y, and W (white or blank indicating an absence of colorant). Other examples may also incorporate multi-level printers, e.g. where print heads are able to deposit N drop levels, in this case an NP may comprise one of $N^k$ combinations of k inks within the printing system, e.g. a CMY printing system with 3 drop levels (0, 1 or 2 drops per pixel) may have 27 NPs.

Figure 2:
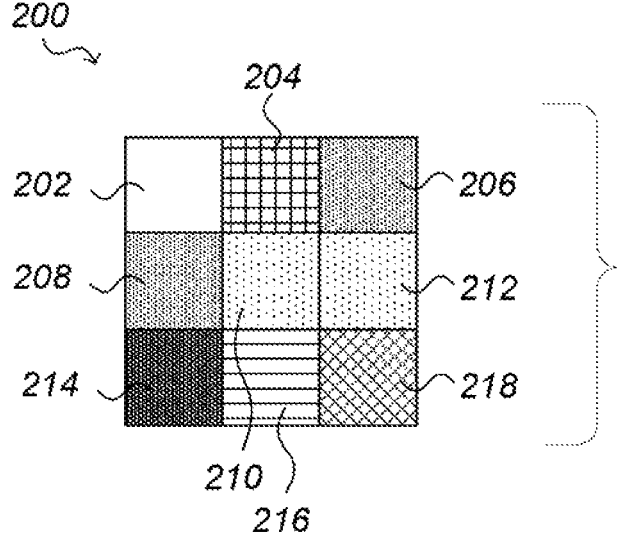
FIG. 2 is a schematic diagram showing a representation of a Neugebauer Primary area coverage vector according to an example.

FIG. 2 shows an example NPac vector 200 for a CMY imaging system. This example shows a unit area for an output image that comprises a three-by-three pixel area 210. In implementations the unit area for an NPac vector may depend on the resolution of the imaging system (e.g. dots per square inch in a printing system). The NPac vector 200 defines the area coverages of the eight NPs for the unit area; for example, in this case: one pixel of White (W) (202); one pixel of Cyan (C) (204); two pixels of Magenta (M) (206, 208); no pixels of Yellow (Y); two pixels of Cyan+Magenta (CM) (210, 212); one pixel of Cyan+Yellow (CY) (214); one pixel of Magenta+Yellow (MY) (216); and one pixel of Cyan+Magenta+Yellow (CMY) (218). As can be seen, the component values of each NPac vector sum to one, i.e. to represent the total area of the unit area.

Although an example three-by-three pixel area is shown in FIG. 2, this is for ease of explanation; the unit area may be of any size and/or there may be multiple levels of units. For example, an n by n millimeter region may comprise a unit area and an imaging device may be arranged to output areas of NP to match an NPac vector definition. In one case, an NPac vector may be approximated for a particular unit area, with any error being diffused or propagated to neighboring unit areas, such that for a given level the error between an output image and an NPac vector is minimized. Likewise, although a CMY system is described for this example for ease of explanation, other imaging systems may be used.

According to certain examples described herein, an NPac color space is used as a domain within which a color separation is defined, as compared to colorant vectors as is the case in comparative imaging pipelines. In these examples, the indexing space in which a color mapping process and a halftoning process communicate is NPac space. This is in contrast to a comparative colorant vector pipeline wherein color mapping is performed to a colorant vector space, and then halftoning is performed on continuous tone data in the colorant vector space to generate an output image. In contrast, in certain present examples, a halftone image on a substrate comprises a plurality of pixels or dots wherein the spatial density of the pixels or dots is defined in NPac color space and controls the colorimetry of an area of the image, i.e. the halftoning process implements the area coverages as defined in the NPac vectors. An example of an imaging system that uses NPac values in image processing is a Halftone Area Neugebauer Separation (HANS) pipeline.

Otherwise identical printers may have different printing characteristics. These differing characteristics, may include for example, the size of droplets of colorants outputted by the printer. Further, these droplet sizes may differ between different colors of colorant. These characteristics may also change over time, or vary due to environmental conditions and/or usage history.

As previously described, NPac vectors comprise coverage areas for a set of Neugebauer Primaries. The color mapping to the NPac space may be specific dependent on the type of printer. A change in droplet size may result in less/more of a specific color being printed by the printer. This may result in the desired overall color to be produced by the NPac vector being different to that which was intended.

Color calibration of a printer may compensate for these unintended differences by generating NPac vectors which consider the operational characteristics of the printer.

Figure 3:
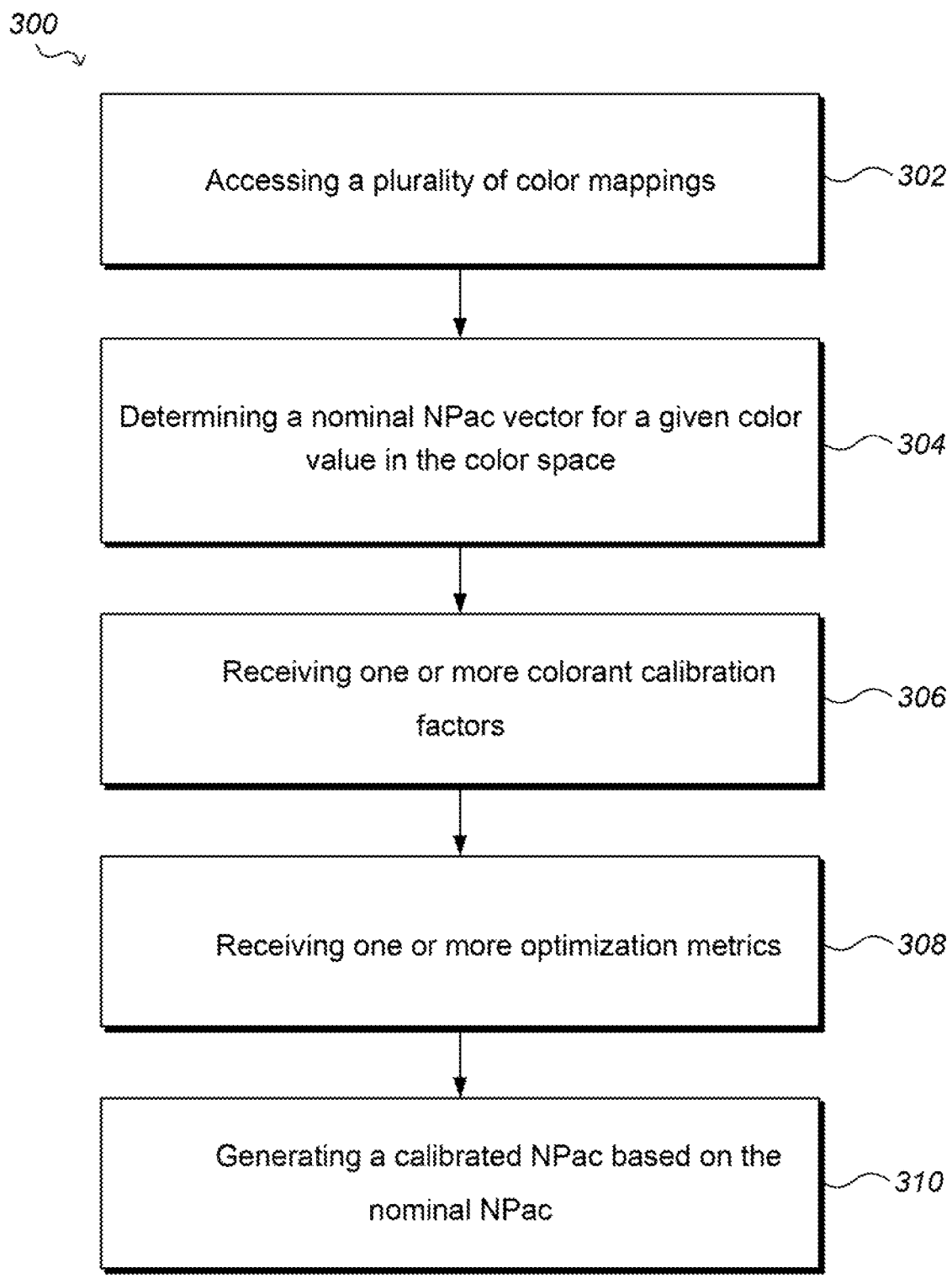
FIG. 3 is a flow diagram showing a method of printer color calibration according to an example.

FIG. 3 is a process diagram of a method of color calibration by generating calibrated NPac vectors. Firstly (302) a plurality of color mappings are accessed. As previously described, each color mapping may provide a mapping from a color value in a color space to a Neugebauer Primary area coverage (NPac) vector in the NPac space.

Next the color mapping of a nominal NPac vector from the NPac space is determined (304) for a given color value in the color space. The given color may be, for example, a pixel in the RGB space of a digitally stored image.

Once the nominal NPac vector has been determined, one or more colorant calibration factors each associated with a color of colorant may be received (306), wherein the calibration factors represent operational characteristics of the printer.

The calibration factors may represent specific operation characteristics pertaining to a specific color of colorant. For example, a calibration factor may be 0.8 for a single color, for example cyan, or it may be the same across all the colors. The calibration factor may set based on the drop size compared to a nominal drop size.

Calibration factors for a specific printer may be generated in several ways. One method is to print using the printer to be calibrated a specific reference page. This page may comprise patterns or line of the each of the individual colorant colors. This page may then be scanned into a computer device using a scanning device. The scanned page may then be compared with a set of reference values. For example, the droplet size may be compared for each colorant on the reference page. The difference between the scanned reference page and the set of reference value may then be used to calculate a set of calibration factors. Calibration factors may also take other factors into account, such as the size of printed Neugebauer Primaries.

At this point it would be possible to generate a calibrated NPac. The calibrated NPac vector can be generated such that for each given color of colorant, the usage of colorant associated with the generated calibrated NPac vector is equal to the product of:

usage of colorant associated with the nominal NPac vector; and the calibration factor for the given color of colorant.

That relation is represented by the following equation for a per-colorant colorant use:

$$\text{New colorant use} = \text{nominal NPac colorant use} * \text{calibration factor} \quad (1)$$

To generate a calibrated NPac, it would be possible to invert the following equation (2) which constrains the calibrated NPac to result in the target colorant use, given from equation (1).

$$\text{calibratedNPac} * \text{NP} = \text{new colorant use vector} \quad (2)$$

where calibratedNPac is a 1×n vector containing area coverages for each of the Neugebauer Primaries of the system specifying the calibrated NPac, NP is an n×m matrix containing each of the n Neugebauer Primaries' colorant usage vectors as rows (for a system with m inks), and the new colorant use vector is a 1×m vector containing the result of equation (1) for the calibrated new colorant use for each of the m inks of the system.

The above equation (2) defines a system of linear equations for which there may be multiple calibratedNPac solutions. That is, for NPac colour calibration on a per-ink channel basis, there may be multiple possible calibrated NPacs that could satisfy equation (1) and replace the nominal NPac in a colour mapping.

It would be possible at this point to generate a solution to equation (2) to provide a calibrated NPac simply by inverting equation (2) using, for example, a Moore-Penrose pseudoinverse using equation (3) below.

$$\text{calibratedNPac} == \text{new colorant use vector} * NP^+ \quad (3)$$

However, this approach may reveal a solution that is not unique. Further, it does not provide a solution that is necessarily convex, which is a constraint for NPacs. Convexity is where the sum of each of the components of the NPac vector equal one, and wherein no single component is less than zero or more than one. Convexity of the calibrated NPac vector ensures that the NPac vector may be reproduced by the printer, as in the printing domain it may not be possible to print a negative amount of colorant. Thus performing a pseudoinverse on equation (2) does not guarantee a reproducible calibrated NPac. Further still, such an inverse does not enable control of a calibrated NPac's properties, such as to allow the resulting color calibration to meet certain desired rendering characteristics.

In accordance with the following examples, the method of color calibration will now be described that enables the generation of reproducible calibrated NPacs, as well as the controlling of characteristics of images rendered using the resulting colour calibration.

To allow control of the calibrated NPac chosen as a solution to equation (2), optimization is performed based on one or more calibration metrics. Thus, as well as the calibration factors, one or more optimization metrics for constraining desired properties of an objective calibrated NPac vector to be generated are also received (308) by the color calibration process (300).

There are often multiple different NPac vectors in a particular NPac space which mathematically produce the same overall color. These NPac vectors may still differ in appearance to the human eye.

For example, CMYK is a subtractive color model. When printing, the amount of 'white-space', i.e. the color of the paper used may be considered. It may be desirable for the amount of 'white-space' used when printing to be minimized. An increased amount of white-space across a printed page as whole, may increase the grain size of the printed area, i.e. individual droplets are more likely to be recognized by the human eye. It may therefore be desirable to select optimization metrics which minimize the white space used in a calibrated NPac vector.

In another example, the optimization metrics may be selected to ensure the generated calibrated NPac vector is as close to the nominal NPac vector as possible, for example the deviation from the proportions of each Neugebauer Primary used is minimized.

In a further example, the optimization metrics may progressively: minimize use of white space; minimize use of NPs not used in the nominal NPac vector and minimize use of NPs used in the nominal NPac vector. This therefore penalizes the introduction of Neugebauer Primaries not originally used in the nominal NPac vector.

To achieve this constraining of the selection of the calibrated NPacs to meet an objective for the characteristics of the calibrated rendering, the optimization metrics are chosen and encoded into an objective function to be applied in the generation of the calibrated NPac vector. The objective function is constructed as a vector having as many elements as there are Neugebauer Primaries in an NPac vector. The value applied to each element of the objective function is chosen to apply a cost, or a weighting, to a corresponding NP in the NPac vector in an optimization process used to generate the calibrated NPac vector. The objective function, with elements selected accordingly, can thereby apply optimization constraints or metrics to the generated calibrated NPac vector.

The objective function seeks through the optimization process to promote or penalize the use of Neugebauer Primaries in a calibrated NPac vector to seek the same desired characteristic of the image.

At this stage, the calibrated NPac vector can now be generated (310) using an optimization technique to solve for an objective calibrated NPac that considers the nominal NPac vector, the calibration factors, optimization metrics and convexity. As mentioned above, the generated calibrated NPac vector is constrained such that it is convex. Convexity is wherein the sum of each of the components of the NPac vector equal one, and wherein no single component is less than zero or more than one. Convexity of the calibrated NPac vector ensures that the NPac vector may be reproduced by the printer, as in the printing domain it may not be possible to print a negative amount of colorant.

The calibrated NPac vector is also generated such that for each given color of colorant, the equations (1) and (2) above are satisfied.

The equation (1) ensures that the amount of any one colorant used is limited by its respective calibration factor which therefore factors in the printing constraints of a particular color of colorant.

One or more of a range of optimization techniques may be used in generating the calibrated NPac vector.

In some embodiments, a non-negative linear least square optimization may be used. The solution vector using this optimization may be constrained to be non-negative and equal to 1 which thereby satisfies the convexity constraint.

In some embodiments, constrained linear least squares optimization may also be used. This may be used to, for example, ensure the calibrated NPac vector to be generated is a solution to equation (2) that is constrained to achieve a desired characteristic in the calibrated rendering. In this optimization, the constructed objective function, (which may also be referred to as a cost function, loss function, reward function, profit function, utility function, fitness function) is applied in the form of minimizing:

$$\|Cx-d\|$$

Wherein C is a matrix, d is a vector and x is the NPac vector to be solved for (e.g. the calibrated NPac).

In one example, to constrain a calibrated NPac to be a minimum distance from a desired NPac (such as the nominal NPac), C could be set as an identity matrix, d as the NPac to which distance is to be minimized (e.g. the nominal NPac), by minimizing the above function the similarity between Cx and d is maximized. Therefore the generated NPac vector is closest to that of the nominal NPac vector that still satisfies the calibration factor constraints.

In another example, the objective function that would result in optimising white-space minimization constraint is a vector that has 1 for all values except for the colorant component that corresponds to the blank/white Neugebauer Primary. A value such as 100 could be chosen for the blank/white component as it is some value orders of magnitude higher than one. Since this is a vector that is being minimized, the use of white is effectively penalized.

In embodiments, a linear or quadrating programming optimization may also be used. In this optimization, minimization of a linear cost function is used in the form of:

$$f^T x$$

Wherein f is a vector of known coefficients and x is to be solved, i.e. generate the calibrated NPac vector.

Further, a combination of quadratic and linear programming is possible. Wherein the function used is in the form of:

$$\frac{1}{2}x^T H x + f^T x$$

Wherein the quadratic term $$\frac{1}{2}x^T H x$$

may be used to compute Euclidean distance and the linear terms for a weighing. Thereby allowing a combination of differing optimization metrics to define the properties of the desired NPac vector. Linear programming generating a calibrated NPac vector that uses a specific balance of Neugebauer Primaries, such that it allows the function that is minimized to be a weighing function.

Once the calibrated NPac vector has been generated, it may go through halftoning as previously described before being printed by a printer.

The calibrated NPac vector may further be stored in memory, for example by adding it to the color mapping. This therefore may allow the calibrated NPac to be re-used in future without performing the method as previously described.

A specific example will now be given of the method of generating a calibrated NPac vector. In this example, eight colors (Cyan, Magenta, Yellow, Black, Red, Green, Blue, White) of colorant are used with up to four drop levels. This therefore results in 65536 Neugebauer Primaries ($4^8$).

A node in the RGB space representing the color 'cyan' may be represented as [R=0%, G=100%, B=100%]. A nominal NPac vector in the NPac space for this color may be [C=2%, CC=98%]. Note that the remaining Neugebauer Primaries are not used, and hence are not shown. 'CC' indicates two drops of Cyan.

In this example, a calibration factor of 0.8 (i.e. a 20% reduction) for all colorant colors is used. The linear least squares objective function is used which also allows for the use of the blank, i.e white, Neugebauer Primary to be used. The resulting calibrated NPac vector is [W=20%, C=2%, CC=58%].

The objective function has compensated for the calibration factor constraint by the introduction of twenty percent of white space. As previously mentioned, it may be desirable to minimize white-space.

If a linear programming objective function is used alternatively, which penalizes the amount of white-space by weighing elements of the function, the generated NPac vector may be [C=42%, CC=58%].

Hence the blank Neugebauer Primary was not used.

In another example, a color green is represented in the RGB space as [R=0%, G=100%, B=6.27%] wherein the corresponding nominal NPac vector is [C=0.2%, CC=8%, GG=8%, GGG=83.8%].

In this example a linear programming objective function is used to minimize-white space across all Neugebauer Primaries comprising the cyan and green colorant colors. These are: Blank, C, G, CC, CG, GG, CCC, CCG, CGG, GGG.

This generates a calibrated NPac vector of [C=1.4%, CC=5.8%, G=30.9%, GG=2.6%, GGG=59.3%]. Now a single drop of green is used which as a Neugebauer Primary. This was not used in the original NPac vector. It is here used at 30.9% and the remaining Neugebauer Primaries have been rebalanced.

A 20% reduction has been achieved and introduction of white space has been avoided. Hence in this example the solution of the objective function was sought over an extended set of Neugebauer Primaries (those already present in the nominal NPac vector) and new Neugebauer Primaries which may contribute to the change, given the metrics chosen.

The invention claimed is:

1. A method for color calibration for a printer, the method comprising:
   determining from a color mapping a nominal Neugebauer Primary area coverage (NPac) vector from an NPac space, the nominal NPac vector corresponding to a given color value in a color space;
   receiving:
   a colorant calibration factor associated with a color of colorant, the calibration factor representing an operational characteristic of the printer, and
   an optimization metric for constraining desired properties of an objective calibrated NPac vector to be generated; and
   generating the calibrated NPac vector based on the nominal NPac vector such that:
   the generated calibrated NPac vector is convex; and
   for each given color of colorant, the usage of colorant associated with the generated calibrated NPac vector is equal to the product of:
   usage of colorant associated with the nominal NPac vector; and
   the calibration factor for the given color of colorant.

2. The method of claim 1, wherein the one or more optimization metrics are selected to minimize or maximize the use of one or more Neugebauer Primaries (NPs) forming the calibrated NPac vector by weighing components of an objective function.

3. The method of claim 1, wherein the one or more optimization metrics are selected to ensure the properties of the selected calibrated NPac vector are closest to the nominal NPac vector by weighing components of an objective function.

4. The method of claim 1, wherein the one or more optimization metrics are selected to modify grain appearance of images rendered using the calibrated NPacs.

5. The method of claim 1, wherein the optimization metrics are selected to progressively:
   minimize use of white space;
   minimize use of NPs not used in the nominal NPac vector; and
   minimize use of NPs used in the nominal NPac vector.

6. The method of claim 1, comprising half-toning the calibrated NPac vector.

7. The method of claim 6, comprising printing the halftoned calibrated NPac vector.

8. The method of claim 1, wherein the calibration factors are determined by scanning a page printed by the printer and comparing the scanned page with reference values.

9. The method of claim 1, comprising adding the calibrated NPac to the color mapping.

10. The method of claim 1, comprising performing a non-negative linear least squares optimization using the received optimization metrics to generate the calibrated NPac vector.

11. The method of claim 1, comprising performing a constrained linear least squares optimization using the received optimization metrics to generate the calibrated NPac vector.

12. The method of claim 1, comprising performing linear or quadratic programming optimization using the received optimization metrics to generate the calibrated NPac vector.

13. The machine-readable storage medium of claim 12, wherein the one or more optimization metrics are selected to minimize or maximize the use of one or more Neugebauer Primaries (NPs) forming the calibrated NPac vector by weighing components of an objective function.

14. The machine-readable storage medium of claim 12, wherein the one or more optimization metrics are selected to ensure the properties of the selected calibrated NPac vector are closest to the nominal NPac vector by weighing components of an objective function.

15. A machine-readable storage medium encoded with instructions for color calibration of a printer, the instructions executable by a processor of a system to cause the system to:
- access a plurality of color mappings, each color mapping providing a mapping from a color value in a color space to a Neugebauer Primary area coverage (NPac) vector in the NPac space;
- determine from the color mapping a nominal NPac vector from the NPac space, for a given color value in the color space;
- receive:
   - one or more colorant calibration factors each associated with a color of colorant, the calibration factors representing operational characteristics of the printer, and
   - one or more optimization metrics for constraining desired properties of an objective calibrated NPac vector to be generated; and
- generate the calibrated NPac vector based on the nominal NPac vector such that:
   - the generated calibrated NPac vector is convex; and
   - for each given color of colorant, the usage of colorant associated with the generated calibrated NPac vector is equal to the product of:
     - usage of colorant associated with the nominal NPac vector; and
     - the calibration factor for the given color of colorant.

* * * * *